(12) United States Patent
Oe

(10) Patent No.: US 12,393,001 B2
(45) Date of Patent: Aug. 19, 2025

(54) LENS FOR FILMING

(71) Applicant: Nittoh Inc., Nagano (JP)

(72) Inventor: Kazuhiro Oe, Nagano (JP)

(73) Assignee: Nittoh Inc., Nagano (JP)

( * ) Notice: Subject to any disclaimer, the term of this patent is extended or adjusted under 35 U.S.C. 154(b) by 695 days.

(21) Appl. No.: 17/311,732

(22) PCT Filed: Dec. 16, 2019

(86) PCT No.: PCT/JP2019/049130
§ 371 (c)(1),
(2) Date: Jun. 8, 2021

(87) PCT Pub. No.: WO2020/137650
PCT Pub. Date: Jul. 2, 2020

(65) Prior Publication Data
US 2022/0026688 A1    Jan. 27, 2022

(30) Foreign Application Priority Data
Dec. 25, 2018 (JP) ................. 2018-240746

(51) Int. Cl.
G02B 13/02     (2006.01)
G02B 9/64      (2006.01)
H04N 23/55     (2023.01)

(52) U.S. Cl.
CPC ............. *G02B 13/02* (2013.01); *G02B 9/64* (2013.01); *H04N 23/55* (2023.01)

(58) Field of Classification Search
CPC .......... G02B 13/00; G02B 9/00; G02B 13/02; G02B 13/24; G02B 13/18; G02B 9/60; G02B 9/64; G02B 9/62; G02B 7/02; G02B 7/028; G02B 15/17; G02B 15/177; G02B 15/14; G02B 15/22; G02B 15/173; G02B 27/64; G02B 27/646; H04N 23/55;
(Continued)

(56) References Cited

U.S. PATENT DOCUMENTS

| | | | |
|---|---|---|---|
| 2011/0096410 A1* | 4/2011 | Ryu | ............... G02B 15/145113 359/693 |
| 2011/0228158 A1 | 9/2011 | Imaoka et al. | |
| 2014/0184887 A1 | 7/2014 | Yonetani et al. | |

(Continued)

FOREIGN PATENT DOCUMENTS

| | | | | |
|---|---|---|---|---|
| JP | 2014109666 | * | 6/2014 | ............. G02B 13/18 |
| JP | 2014-142601 A | | 8/2014 | |

(Continued)

OTHER PUBLICATIONS

Schott, "Temperature Coefficient of the Refractive Index"; Technical information, Advanced Optics, Jul. 2008. (Year: 2008).*

(Continued)

*Primary Examiner* — Jie Lei
(74) *Attorney, Agent, or Firm* — Harter Secrest & Emery LLP; Timothy W. Menasco, Esq.

(57) ABSTRACT

A lens for filming includes a plurality of movable lenses arranged apart from each other in the direction of an optical axis, and which move in the direction of the optical axis for focusing, and a fixed lens, which does not move, is provided between at least one pair of lenses adjacent to each other among them.

17 Claims, 10 Drawing Sheets

EXAMPLE 1

(58) Field of Classification Search
CPC ........ H04N 5/232; H04N 5/262; H04N 5/225; H04N 5/228; H04N 5/2254
USPC ....... 359/642, 676, 557, 683, 659, 714, 684, 359/763, 764, 753, 395, 820, 822
See application file for complete search history.

(56) References Cited

U.S. PATENT DOCUMENTS

| | | |
|---|---|---|
| 2015/0338622 A1 | 11/2015 | Kuzuhara et al. |
| 2016/0178875 A1 | 6/2016 | Matsumura et al. |
| 2017/0276917 A1 | 9/2017 | Iwamoto |
| 2018/0059384 A1 | 3/2018 | Noda |
| 2019/0113708 A1 | 4/2019 | Kobayashi |

FOREIGN PATENT DOCUMENTS

| | | |
|---|---|---|
| JP | 2015-043016 A | 3/2015 |
| JP | 2015-215437 A | 12/2015 |
| JP | 2016-118770 B2 | 6/2016 |
| JP | 2017-129668 B2 | 7/2017 |
| JP | 2017-173680 B2 | 9/2017 |
| JP | 2018-031831 A | 3/2018 |
| JP | 2019-074671 A5 | 5/2019 |
| JP | 2020-016679 A | 1/2020 |
| WO | 2014/129170 A1 | 8/2014 |

OTHER PUBLICATIONS

English translation of JP2014109666. (Year: 2014).*
International Search Report for PCT/JP2019/049130 dated Feb. 28, 2020, mailed Mar. 17, 2020.
Interntional Search Opinon for PCT/JP2019/049130 dated Feb. 28, 2020.
Office Action for Japanese Patent Application No. 2020-563096 with English Translation.
European Patent Office, Suplementary European Search Report for Application No. EP19901435, Oct. 8, 2022.

* cited by examiner

FIG.1　　EXAMPLE 1

FIG.2
EXAMPLE 1
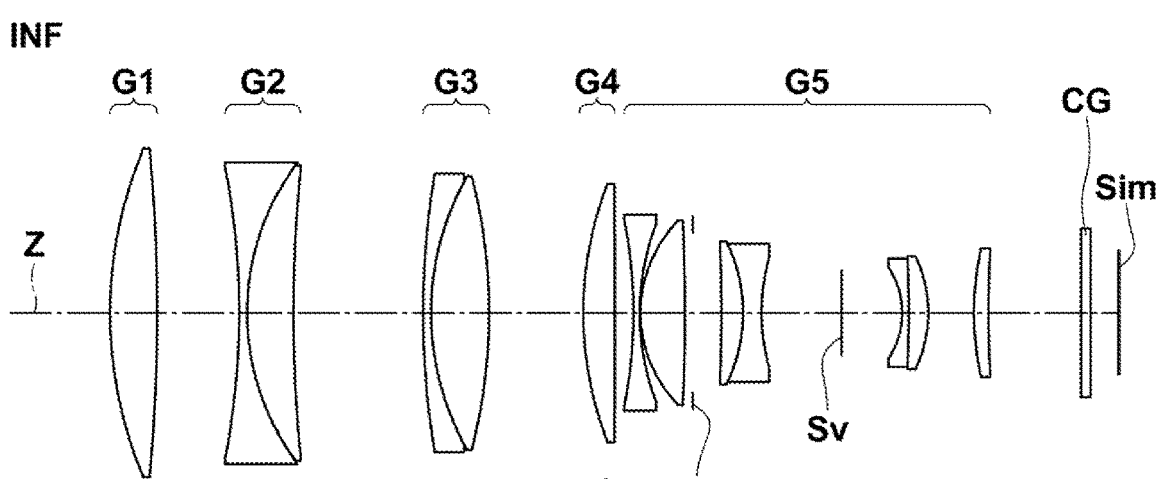
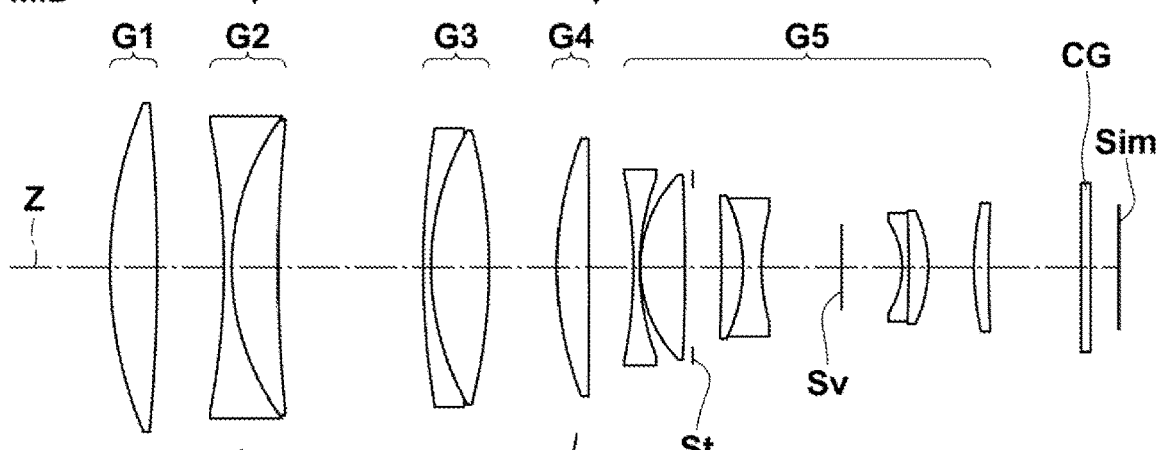
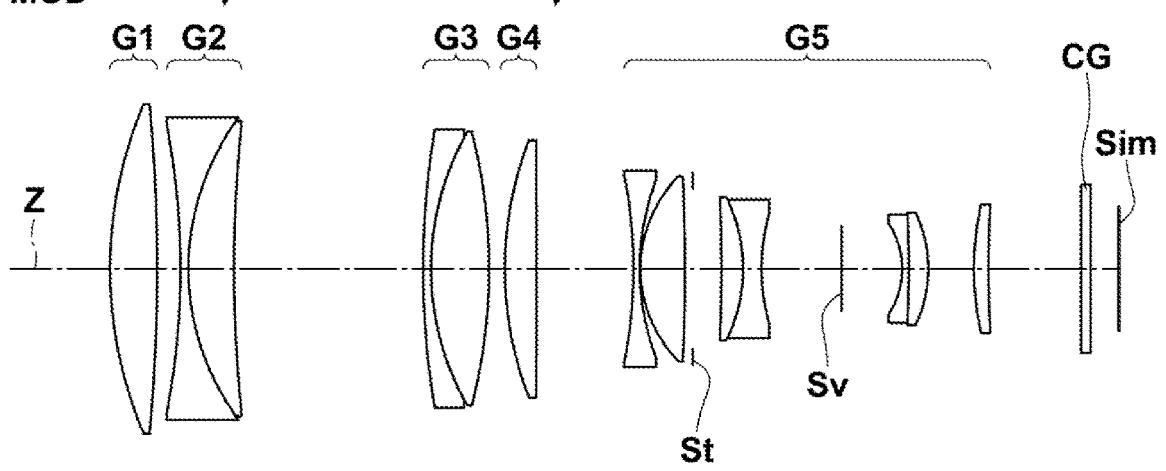

FIG.3

EXAMPLE 1

| No. | LENS etc. | CURVATURE RADIUS (Ri)mm | SURFACE DISTANCE (di)mm | EFFECTIVE DIAMETER (Di)mm | REFRACTIVE INDEX (nd) | ABBE'S NUMBER (νd) | FOCAL LENGTH (mm) |
|---|---|---|---|---|---|---|---|
| 0 | OBJ | Flat | INF | | | | |
| 1 | L1 | 153.6 | 15.0 | 107.9 | 1.51860 | 69.89 | 241.500 |
| 2 | | −656.4 | 26.1 | 106.9 | | | |
| 3 | L2 | −279.2 | 2.5 | 98.8 | 1.72047 | 34.71 | −95.590 |
| 4 | L3 | 91.8 | 14.5 | 96.7 | 1.80518 | 25.42 | 136.110 |
| 5 | | 524.2 | 41.2 | 96.3 | | | |
| 6 | L4 | 309.3 | 2.5 | 91.2 | 1.73800 | 32.33 | −204.260 |
| 7 | L5 | 101.0 | 18.5 | 89.5 | 1.49700 | 81.54 | 138.270 |
| 8 | | −202.0 | 29.7 | 89.4 | | | |
| 9 | L6 | 130.5 | 10.1 | 84.3 | 1.53775 | 74.70 | 239.640 |
| 10 | | −9814.0 | 5.9 | 83.0 | | | |
| 11 | L7 | −175.8 | 2.0 | 63.8 | 1.48749 | 70.24 | −123.870 |
| 12 | | 92.3 | 0.2 | 60.7 | | | |
| 13 | L8 | 47.7 | 14.1 | 59.9 | 1.51860 | 69.89 | 87.220 |
| 14 | | −775.0 | 2.5 | 58.1 | | | |
| 15 | St | Flat | 9.1 | 55.0 | | | |
| 16 | L9 | −607.7 | 6.9 | 46.1 | 1.65412 | 39.68 | 99.700 |
| 17 | L10 | −59.2 | 5.9 | 44.5 | 1.72047 | 34.71 | −44.770 |
| 18 | | 73.9 | 25.2 | 38.4 | | | |
| 19 | Sv | Flat | 19.3 | 28.9 | | | |
| 20 | L11 | −30.2 | 2.0 | 31.3 | 1.59522 | 67.73 | −53.540 |
| 21 | L12 | −591.8 | 6.3 | 34.5 | 1.73800 | 32.33 | 70.220 |
| 22 | | −47.9 | 14.5 | 36.0 | | | |
| 23 | L13 | 109.5 | 4.6 | 41.3 | 1.80610 | 40.93 | 195.720 |
| 24 | | 351.2 | 29.4 | 41.2 | | | |
| 25 | CG | Flat | 3.000 | | 1.51680 | 64.17 | INF |
| 26 | | Flat | 9.000 | | | | |
| 27 | Sim | Flat | 0.000 | | | | |

EXAMPLE 1     COMBINED FOCAL LENGTH (mm)

| | |
|---|---|
| L2/L3 | −310.890 |
| L4/L5 | 406.420 |
| L9/L10 | −82.820 |
| L11/L12 | −328.470 |

FIG.4

EXAMPLE 1

FIG.5

| No. | LENS etc. | TEMPERATURE COEFFICIENTS OF REFRACTIVE INDEX ||||| 
|---|---|---|---|---|---|---|
| | | NTb | NTa | NTc | NTa-NTb | NTa-NTc |
| 1 | L1 | 3.6 | 3.7 | 3.9 | 0.1 | -0.2 |
| 2 | | | | | 0.0 | 0.0 |
| 3 | L2 | 3.4 | 3.5 | 3.6 | 0.1 | -0.1 |
| 4 | L3 | 1.5 | 1.8 | 2.0 | 0.3 | -0.2 |
| 5 | | | | | 0.0 | 0.0 |
| 6 | L4 | 5.5 | 5.5 | 5.6 | 0.0 | -0.1 |
| 7 | L5 | -5.6 | -6.1 | -6.3 | -0.5 | 0.2 |
| 8 | | | | | 0.0 | 0.0 |
| 9 | L6 | -3.8 | -4.2 | -4.3 | -0.4 | 0.1 |
| 10 | | | | | 0.0 | 0.0 |
| 11 | L7 | -0.9 | -0.7 | -0.6 | 0.2 | -0.1 |
| 12 | | | | | 0.0 | 0.0 |
| 13 | L8 | 3.6 | 3.7 | 3.9 | 0.1 | -0.2 |
| 14 | | | | | 0.0 | 0.0 |
| 15 | St | | | | 0.0 | 0.0 |
| 16 | L9 | 4.7 | 5.0 | 5.1 | 0.3 | -0.1 |
| 17 | L10 | 3.4 | 3.5 | 3.6 | 0.1 | -0.1 |
| 18 | | | | | 0.0 | 0.0 |
| 19 | Sv | | | | 0.0 | 0.0 |
| 20 | L11 | -5.5 | -5.9 | -5.9 | -0.4 | 0.0 |
| 21 | L12 | 5.5 | 5.5 | 5.6 | 0.0 | -0.1 |
| 22 | | | | | 0.0 | 0.0 |
| 23 | L13 | 6.9 | 7.3 | 7.6 | 0.4 | -0.3 |
| 24 | | | | | 0.0 | 0.0 |
| 25 | CG | 2.6 | 2.8 | 2.9 | 0.2 | -0.1 |
| 26 | | | | | 0.5 | -1.3 |
| 27 | Sim | | | | | |

FIG.6　EXAMPLE 2

FIG.7

EXAMPLE 2

| No. | LENS etc. | CURVATURE RADIUS (Ri)mm | SURFACE DISTANCE (di)mm | EFFECTIVE DIAMETER (Di)mm | REFRACTIVE INDEX (nd) | ABBE'S NUMBER ($\nu d$) | FOCAL LENGTH (mm) |
|---|---|---|---|---|---|---|---|
| 0 | OBJ | Flat | INF | | | | |
| 1 | L1 | 168.5 | 14.7 | 107.8 | 1.51860 | 69.89 | 245.080 |
| 2 | | -502.2 | 22.5 | 106.9 | | | |
| 3 | L2 | -268.6 | 2.5 | 99.8 | 1.72047 | 34.71 | -95.160 |
| 4 | L3 | 92.4 | 15.2 | 98.1 | 1.78472 | 25.68 | 136.330 |
| 5 | | 629.9 | 42.6 | 97.8 | | | |
| 6 | L4 | 276.8 | 2.5 | 93.8 | 1.73800 | 32.26 | -213.530 |
| 7 | L5 | 100.0 | 19.1 | 92.0 | 1.53775 | 74.70 | 129.940 |
| 8 | | -216.3 | 29.5 | 91.8 | | | |
| 9 | L6 | 146.3 | 9.6 | 86.9 | 1.49782 | 82.57 | 296.090 |
| 10 | | 18730.1 | 5.1 | 85.6 | | | |
| 11 | L7 | -174.2 | 2.0 | 65.4 | 1.48749 | 70.24 | -127.660 |
| 12 | | 97.2 | 0.2 | 62.3 | | | |
| 13 | L8 | 47.7 | 14.2 | 61.5 | 1.51860 | 69.89 | 91.950 |
| 14 | | 63245.3 | 3.0 | 59.6 | | | |
| 15 | St | Flat | 3.9 | 56.6 | | | |
| 16 | L9 | 258.3 | 8.3 | 51.4 | 1.65412 | 39.68 | 93.070 |
| 17 | L10 | -78.6 | 2.1 | 49.5 | 1.72047 | 34.71 | -73.590 |
| 18 | | 164.5 | 9.2 | 44.9 | | | |
| 19 | L11 | -850.0 | 2.0 | 38.7 | 1.72047 | 34.71 | -107.570 |
| 20 | | 85.4 | 18.6 | 36.8 | | | |
| 21 | Sv | Flat | 20.0 | 29.8 | | | |
| 22 | L12 | -29.5 | 2.0 | 31.5 | 1.59522 | 67.73 | -75.080 |
| 23 | | -88.6 | 0.3 | 34.1 | | | |
| 24 | L13 | -84.3 | 4.6 | 34.2 | 1.84666 | 23.78 | 136.090 |
| 25 | | -49.9 | 21.7 | 35.8 | | | |
| 26 | L14 | 96.0 | 5.6 | 44.9 | 1.78590 | 44.20 | 126.650 |
| 27 | | 2616.1 | 28.3 | 44.8 | | | |
| 28 | CG | Flat | 3.0 | | 1.51680 | 64.17 | INF |
| 29 | | Flat | 7.8 | | | | |
| 30 | Sim | Flat | 0.000 | | | | |

EXAMPLE 2    COMBINED FOCAL LENGTH (mm)

| | |
|---|---|
| L2/L3 | -307.130 |
| L4/L5 | 319.700 |
| L9/L10 | -382.42 |

FIG.8

EXAMPLE 2

FIG.9

| No. | LENS etc. | TEMPERATURE COEFFICIENTS OF REFRACTIVE INDEX ||||| 
|---|---|---|---|---|---|---|
| | | NTb | NTa | NTc | NTa-NTb | NTa-NTc |
| 1 | L1 | 3.6 | 3.7 | 3.9 | 0.1 | -0.2 |
| 2 | | | | | 0.0 | 0.0 |
| 3 | L2 | 3.4 | 3.5 | 3.6 | 0.1 | -0.1 |
| 4 | L3 | 1.6 | 2.1 | 2.3 | 0.5 | -0.2 |
| 5 | | | | | 0.0 | 0.0 |
| 6 | L4 | 5.7 | 5.9 | 6.0 | 0.2 | -0.1 |
| 7 | L5 | -3.8 | -4.2 | -4.3 | -0.4 | 0.1 |
| 8 | | | | | 0.0 | 0.0 |
| 9 | L6 | -5.5 | -6.1 | -6.3 | -0.6 | 0.2 |
| 10 | | | | | 0.0 | 0.0 |
| 11 | L7 | -0.9 | -0.7 | -0.6 | 0.2 | -0.1 |
| 12 | | | | | 0.0 | 0.0 |
| 13 | L8 | 3.6 | 3.7 | 3.9 | 0.1 | -0.2 |
| 14 | | | | | 0.0 | 0.0 |
| 15 | St | | | | 0.0 | 0.0 |
| 16 | L9 | 4.7 | 5.0 | 5.1 | 0.3 | -0.1 |
| 17 | L10 | 3.4 | 3.5 | 3.6 | 0.1 | -0.1 |
| 18 | | | | | 0.0 | 0.0 |
| 19 | L11 | 3.4 | 3.5 | 3.6 | 0.1 | -0.1 |
| 20 | | | | | 0.0 | 0.0 |
| 21 | Sv | | | | 0.0 | 0.0 |
| 22 | L12 | -5.5 | -5.9 | -5.9 | -0.4 | 0.0 |
| 23 | | | | | 0.0 | 0.0 |
| 24 | L13 | 1.6 | 2.0 | 2.2 | 0.4 | -0.2 |
| 25 | | | | | 0.0 | 0.0 |
| 26 | L14 | 6.6 | 6.8 | 7.0 | 0.2 | -0.2 |
| 27 | | | | | 0.0 | 0.0 |
| 28 | CG | 2.6 | 2.8 | 2.9 | 0.2 | -0.1 |
| 29 | | | | | 1.1 | -1.4 |
| 30 | Sim | | | | | |

FIG.10  EXAMPLE 3

FIG.11

EXAMPLE 3

| No. | LENS etc. | CURVATURE RADIUS (Ri)mm | SURFACE DISTANCE (di)mm | EFFECTIVE DIAMETER (Di)mm | REFRACTIVE INDEX (nd) | ABBE'S NUMBER (νd) | FOCAL LENGTH (mm) |
|---|---|---|---|---|---|---|---|
| 0 | OBJ | Flat | INF | | | | |
| 1 | L1 | 160.0 | 14.7 | 107.3 | 1.51860 | 69.89 | 243.390 |
| 2 | | -578.5 | 25.2 | 106.6 | | | |
| 3 | L2 | -269.4 | 2.5 | 98.8 | 1.72047 | 34.71 | -94.920 |
| 4 | L3 | 92.0 | 14.9 | 97.4 | 1.80518 | 25.42 | 134.590 |
| 5 | | 565.7 | 37.6 | 97.1 | | | |
| 6 | L4 | 310.1 | 2.5 | 92.5 | 1.73800 | 32.26 | -190.070 |
| 7 | L5 | 96.3 | 19.4 | 90.7 | 1.53775 | 74.70 | 124.770 |
| 8 | | -205.9 | 27.6 | 90.5 | | | |
| 9 | L6 | 133.5 | 10.0 | 85.7 | 1.49700 | 81.65 | 270.640 |
| 10 | | 17285.5 | 5.5 | 84.3 | | | |
| 11 | L7 | -153.2 | 2.0 | 65.0 | 1.48749 | 70.24 | -126.800 |
| 12 | | 104.1 | 0.2 | 62.0 | | | |
| 13 | L8 | 55.3 | 13.3 | 61.4 | 1.51860 | 69.89 | 95.830 |
| 14 | | -448.1 | 2.0 | 59.8 | | | |
| 15 | St | Flat | 7.2 | 57.1 | | | |
| 16 | L9 | 561.4 | 8.5 | 49.8 | 1.67300 | 38.15 | 81.910 |
| 17 | L10 | -60.8 | 6.0 | 48.2 | 1.72047 | 34.71 | -50.370 |
| 18 | | 93.9 | 12.2 | 41.4 | | | |
| 19 | L11 | 8816.3 | 6.0 | 35.9 | 1.48749 | 70.24 | -185.610 |
| 20 | | 89.5 | 11.2 | 33.2 | | | |
| 21 | Sv | Flat | 29.0 | 30.3 | | | |
| 22 | L12 | -32.2 | 2.0 | 34.9 | 1.59522 | 67.73 | -82.730 |
| 23 | | -95.3 | 0.2 | 37.9 | | | |
| 24 | L13 | -178.3 | 5.9 | 38.6 | 1.73800 | 32.26 | 97.990 |
| 25 | | -52.2 | 8.3 | 40.1 | | | |
| 26 | L14 | 91.6 | 4.5 | 43.5 | 1.83481 | 42.72 | 197.790 |
| 27 | | 201.1 | 28.3 | 43.2 | | | |
| 28 | CG | Flat | 3.0 | | 1.51680 | 64.17 | INF |
| 29 | | Flat | 10.3 | | | | |
| 30 | Sim | Flat | 0.000 | | | | |

EXAMPLE 3   COMBINED FOCAL LENGTH (mm)

| | |
|---|---|
| L2/L3 | -312.500 |
| L4/L5 | 344.920 |
| L9/L10 | -138.99 |

EXAMPLE 3

| No. | LENS etc. | TEMPERATURE COEFFICIENTS OF REFRACTIVE INDEX | | | | |
|---|---|---|---|---|---|---|
| | | NTb | NTa | NTc | NTa-NTb | NTa-NTc |
| 1 | L1 | 3.6 | 3.7 | 3.9 | 0.1 | -0.2 |
| 2 | | | | | 0.0 | 0.0 |
| 3 | L2 | 3.4 | 3.5 | 3.6 | 0.1 | -0.1 |
| 4 | L3 | 1.5 | 1.8 | 2.0 | 0.3 | -0.2 |
| 5 | | | | | 0.0 | 0.0 |
| 6 | L4 | 5.7 | 5.9 | 6.0 | 0.2 | -0.1 |
| 7 | L5 | -3.8 | -4.2 | -4.3 | -0.4 | 0.1 |
| 8 | | | | | 0.0 | 0.0 |
| 9 | L6 | -4.8 | -5.4 | -5.6 | -0.6 | 0.2 |
| 10 | | | | | 0.0 | 0.0 |
| 11 | L7 | -0.9 | -0.7 | -0.6 | 0.2 | -0.1 |
| 12 | | | | | 0.0 | 0.0 |
| 13 | L8 | 3.6 | 3.7 | 3.9 | 0.1 | -0.2 |
| 14 | | | | | 0.0 | 0.0 |
| 15 | St | | | | 0.0 | 0.0 |
| 16 | L9 | 4.2 | 4.2 | 4.2 | 0.0 | 0.0 |
| 17 | L10 | 3.4 | 3.5 | 3.6 | 0.1 | -0.1 |
| 18 | | | | | 0.0 | 0.0 |
| 19 | L11 | -0.9 | -0.7 | -0.6 | 0.2 | -0.1 |
| 20 | | | | | 0.0 | 0.0 |
| 21 | Sv | | | | 0.0 | 0.0 |
| 22 | L12 | -5.5 | -5.9 | -5.9 | -0.4 | 0.0 |
| 23 | | | | | 0.0 | 0.0 |
| 24 | L13 | 5.7 | 5.9 | 6.0 | 0.2 | -0.1 |
| 25 | | | | | 0.0 | 0.0 |
| 26 | L14 | 4.8 | 4.9 | 5.0 | 0.1 | -0.1 |
| 27 | | | | | 0.0 | 0.0 |
| 28 | CG | 2.6 | 2.8 | 2.9 | 0.2 | -0.1 |
| 29 | | | | | 0.4 | -1.1 |
| 30 | Sim | | | | | |

LENS FOR FILMING

CROSS-REFERENCE TO RELATED APPLICATIONS

This application is a National Phase Entry of PCT International Application No. PCT/JP2019/049130 filed on Dec. 16, 2019, which claims priority under 35 U.S.C § 119(a) to Japanese Patent Application No. 2018-240746 filed on Dec. 25, 2018. Each of the above applications is hereby expressly incorporated by reference, in its entirety, into the present application.

TECHNICAL FIELD

The present disclosure relates to a lens for filming.

BACKGROUND ART

Conventionally, a lens for filming, used in film making, is known as disclosed in Japanese Unexamined Patent Publication No. 2015-215437 for example. In the present disclosure, the term "filming" means not only filming for movies, but also a concept of capturing so-called motion pictures, such as video filming and TV filming.

SUMMARY

Technical Problem

However, conventional lenses for filming have room for improvement to suppress so-called focus breathing, i.e., changes in angles of view caused by focusing (an operation for adjusting a focus). In view of the foregoing circumstances, the present disclosure aims at providing a lens for filming that can suppress focus breathing.

A lens for filming according to the present disclosure includes a plurality of movable lenses arranged apart from each other in the direction of an optical axis, and which move in the direction of the optical axis for focusing, and a fixed lens, which does not move, is provided between at least one pair of movable lenses adjacent to each other among the plurality of movable lenses.

The term "lens" in the aforementioned "movable lenses" and "fixed lens" represents not only one lens, but includes a lens group constituted of a plurality of lenses.

In the lens for filming of the present disclosure, it is desirable that a movable lens arranged closest to a subject side among the plurality of movable lenses has negative power, and at least one movable lens arranged toward an image formation side of the movable lens having the negative power has positive power.

Further, when the lens for filming is configured in such a manner, it is desirable that the movable lens having the negative power has a concave surface toward the subject side and a concave surface toward the image formation side, and the movable lens having the positive power has at least a convex surface toward the subject side out of the subject side and the image formation side.

Further, it is desirable that the movable lens having the positive power satisfies following conditional expression (1):

$$-0.1 \leq fa/Ra \leq 0.1 \quad (1),$$

where fa is a focal length and Ra is a curvature radius of the image formation side.

When the aforementioned conditional expression (1) is satisfied, it is desirable that following conditional expression (1-1) is further satisfied:

$$-0.05 \leq fa/Ra \leq 0.05 \quad (1\text{-}1).$$

Further, in that case, it is more desirable that following conditional expression (1-2) or (1-3) is further satisfied:

$$-0.03 \leq fa/Ra \leq 0 \quad (1\text{-}2); \text{ or}$$

$$0 \leq fa/Ra \leq 0.03 \quad (1\text{-}3).$$

Further, in the lens for filming of the present disclosure, it is desirable that following conditional expressions (2) are all satisfied:

$$0.7 \leq ft/|fm1| \leq 1.5;$$

$$0.7 \leq ft/|fm2| \leq 1.5; \text{ and}$$

$$0.4 \leq ft/|fS| \leq 1.2,$$

where ft is the focal length of an entire system of the lens for filming, fm1 is the focal length of a movable lens arranged closest to the subject side among the plurality of movable lenses, fm2 is the focal length of at least one movable lens having positive power arranged toward an image formation side of the fixed lens, and fS is the focal length of the fixed lens. Hereinafter, these three expressions will be referred to as conditional expressions (2) collectively.

Further, when the aforementioned conditional expressions (2) are satisfied, it is desirable that the following conditional expressions are satisfied:

$$0.7 \leq ft/|fm1| \leq 1.1;$$

$$0.8 \leq ft/|fm2| \leq 1.5; \text{ and}$$

$$0.5 \leq ft/|fS| \leq 1.1,$$

where ft is the focal length of an entire system, fm1 is the focal length of a movable lens arranged closest to the subject side among the plurality of movable lenses, fm2 is the focal length of a movable lens having positive power adjacent to the fixed lens toward the image formation side of the fixed lens, and fS is the focal length of the fixed lens. Hereinafter, these three expressions will be referred to as conditional expressions (3) collectively.

Further, when the aforementioned conditional expressions (3) are satisfied, it is more desirable that the following conditional expressions are satisfied:

$$0.8 \leq ft/|fm1| \leq 1;$$

$$1 \leq ft/|fm2| \leq 1.3; \text{ and}$$

$$0.6 \leq ft/|fS| \leq 0.8.$$

Hereinafter, these three expressions will be referred to as conditional expressions (3-1) collectively.

Further, in the lens for filming of the present disclosure, it is desirable that the fixed lens is a cemented lens of a lens having negative power and a lens having positive power.

Further, in the lens for filming of the present disclosure, it is desirable that the movable lenses and the fixed lens are arranged toward the subject side of the position of a stop of the lens for filming.

Further, in the lens for filming of the present disclosure, it is desirable that temperature coefficients of the refractive index of each lens constituting the lens for filming satisfy the following conditional expressions (4):

$$|\Sigma(NTa-NTb)| \leq 2 \text{ and } |\Sigma(NTa-NTc)| \leq 2 \quad (4),$$

where NTa is a temperature coefficient at from 20° C. to 40° C., NTb is a temperature coefficient at from −20° C. to 0° C. and NTc is a temperature coefficient at from 40° C. to 60° C.

The lens for filming according to the present disclosure is able to suppress focus breathing by including a plurality of movable lenses which move in the direction of the optical axis for focusing, and by providing a fixed lens, which does not move, between at least one pair of movable lenses adjacent to each other among the plurality of movable lenses, as described above.

BRIEF DESCRIPTION OF DRAWINGS

FIG. 2 A cross-sectional diagram illustrating the lens for filming in Example 1 in three different focused states FIG. 3 A table showing basic data of optical elements constituting the lens for filming in Example 1

FIG. 4 A table showing combined focal lengths of cemented lenses in Example 1

FIG. 5 A table showing data related to temperature coefficients of the refractive index of each lens in Example 1

FIG. 7 A table showing basic data of optical elements constituting the lens for filming in Example 2

FIG. 8 A table showing combined focal lengths of cemented lenses in Example 2

FIG. 9 A table showing data related to temperature coefficients of the refractive index of each lens in Example 2

FIG. 11 A table showing basic data of optical elements constituting the lens for filming in Example 3

FIG. 12 A table showing combined focal lengths of cemented lenses in Example 3

FIG. 13 A table showing data related to temperature coefficients of the refractive index of each lens in Example 3

DESCRIPTION OF EMBODIMENTS

Hereinafter, embodiments of the present disclosure will be described in detail with reference to drawings. Next, Examples 1 through 3 will be described together with detailed numerical value examples for each composition element.

Example 1

Figure 1:
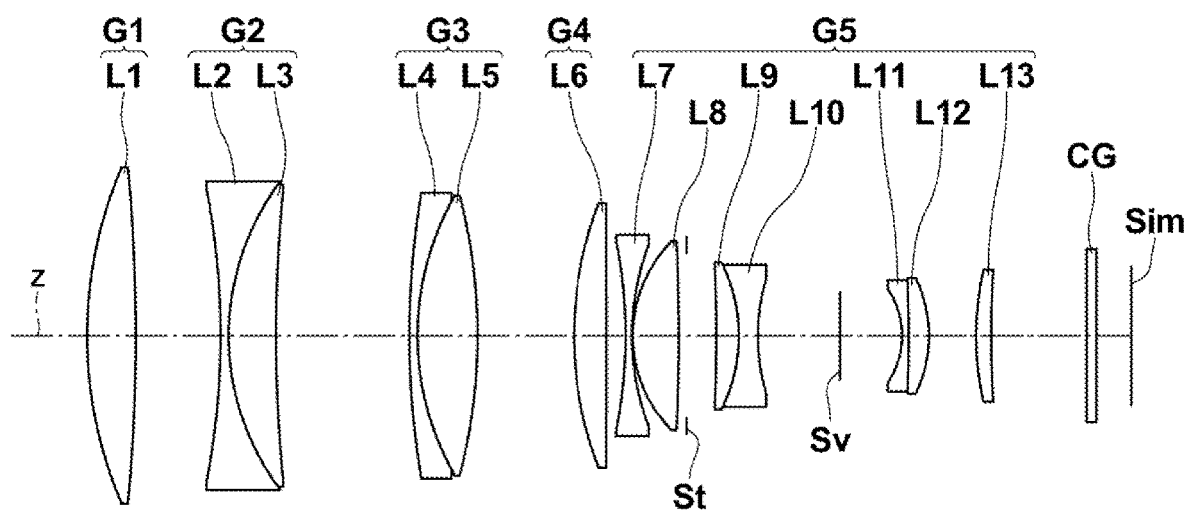
FIG. 1 A cross-sectional diagram illustrating a lens for filming in Example 1
Figure 6:
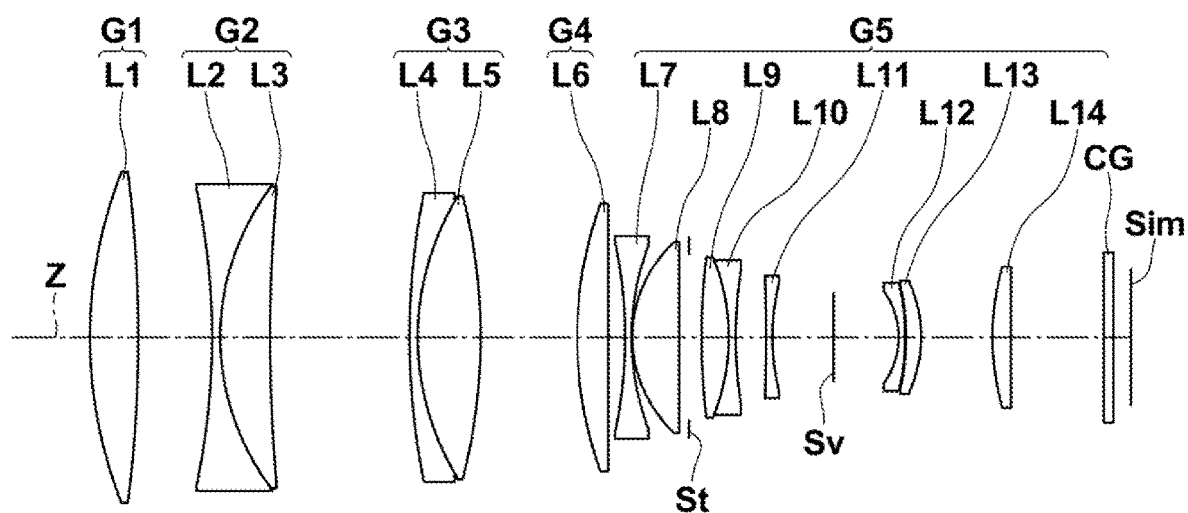
FIG. 6 A cross-sectional diagram illustrating a lens for filming in Example 2
Figure 10:
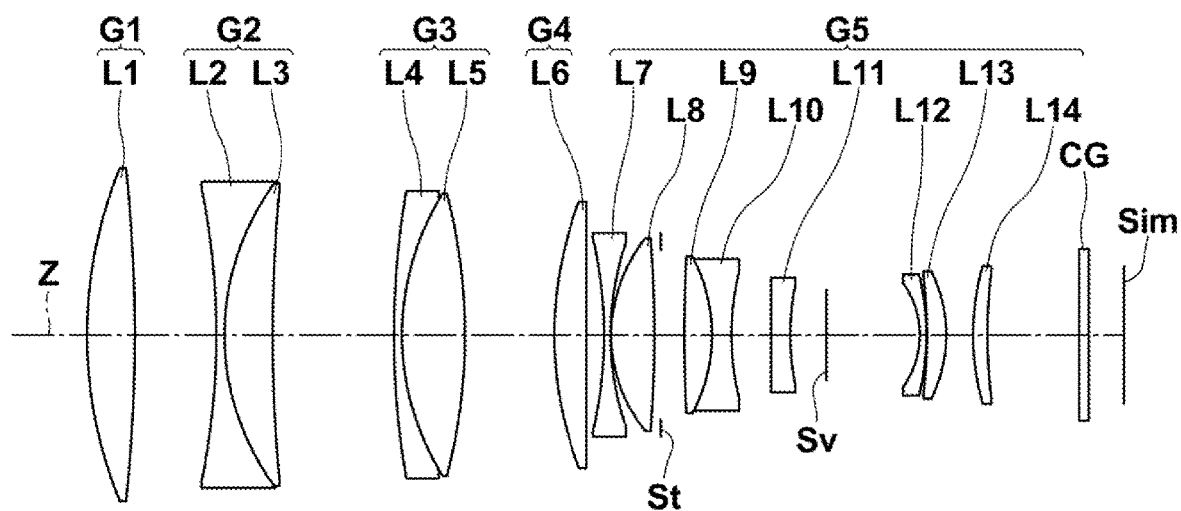
FIG. 10 A cross-sectional diagram illustrating a lens for filming in Example 3

FIG. 1 is a cross-sectional diagram illustrating a lens for filming according to an embodiment of the present disclosure (hereinafter, referred to as a lens for filming in Example 1). In FIG. 1, the left side is the subject side, and the right side is the image formation side, and the lens for filming focused at infinity is illustrated. The illustration method as described above is similar also in FIG. 6 and FIG. 10 illustrating lenses for filming in Example 2 and Example 3, respectively, which will be described later.

The lens for filming in this Example 1 includes first lens group G1 having positive refractive power, second lens group G2 having negative refractive power, third lens group G3 having positive refractive power, fourth lens group G4 having positive refractive power and fifth lens group G5 having negative refractive power, which are arranged along optical axis Z in this order from the subject side. Second lens group G2 and fourth lens group G4 are focus groups, which move in the direction of optical axis Z in such a manner that distances from adjacent lens groups change when focusing (adjustment of a focus) is performed between a subject at infinity and a subject at closest distance, as will be described in detail later. The other lens groups, i.e., first lens group G1, third lens group G3 and fifth lens group G5 are fixed groups, distances of which from image plane Sim do not change during focusing.

Note that the "lens group" includes not only a group constituted of a plurality of lenses, but a group constituted of only one lens. Further, the condition of "having positive refractive power" may be simply expressed by the term "positive" or "positive power". This similarly applies to the condition of "having negative refractive power".

First lens group G1 is constituted of one biconvex lens L1. Second lens group G2 is constituted of biconcave lens L2 and positive meniscus lens L3, cemented to this lens L2, which are arranged along optical axis Z in this order from the subject side. Third lens group G3 is constituted of negative meniscus lens L4 having a convex surface toward the subject side and biconvex lens L5 cemented to this lens L4, which are arranged along optical axis Z in this order from the subject side. Fourth lens group G4 is constituted of one positive biconvex lens L6. Fifth lens group G5 is constituted of biconcave lens L7, biconvex lens L8, negative meniscus lens L9 having a convex surface toward the image formation side, biconcave lens L10 cemented to this lens L9, negative meniscus lens L11 having a convex surface toward the image formation side, positive meniscus lens L12 cemented to this lens L11, and having a convex surface toward the image formation side and positive meniscus lens L13 having a convex surface toward the image formation side, which are arranged along optical axis Z in this order from the subject side.

In fifth lens group G5, aperture stop St is arranged between lens L8 and lens L9, and flare cutter Sv is arranged between lens L10 and lens L11. Aperture stop St and flare cutter Sv in the drawings do not necessarily represent their sizes or shapes, but their positions on optical axis Z. When the lens for filming of the present embodiment is adopted in an imaging apparatus, a cover glass, a prism, various filters, such as an infrared ray cut filter and a low-pass filter, and the like are often arranged between the optical system and image plane Sim based on the configuration of a camera on which the lens is mounted. FIG. 1 assumes such a case, and illustrates an example where cover glass CG in parallel flat plate shape is arranged between the lens system and image plane Sim.

Here, an upper row, a middle row and a lower row in FIG. 2 illustrate a state of being focused at a subject at infinity, a state of being focused at a subject located at a middle position between infinity and a closest distance and a state of being focused at a subject at closest distance of the lens for filming configured as described above, indicated by "INF", "MID" and "MOD", respectively. As illustrated here, in this Example 1, second lens group G2 and fourth lens group G4 move along optical axis Z toward the subject side, as the subject to focus at moves from the far side toward the near side. In contrast, first lens group G1 arranged toward the subject side of second lens group G2, third lens group G3 arranged between second lens group G2 and fourth lens group G4 and fifth lens group G5 arranged toward the image formation side of fourth lens group G4 are fixed groups, which do not move during focusing.

The aforementioned focus breathing is suppressible by arranging the fixed lens, namely third lens group G3, between second lens group G2 and fourth lens group G4, which are arranged apart from each other in the direction of optical axis Z and move in the direction of optical axis Z for focusing. The configuration and the advantageous effect achievable by the configuration, as described so far, are also applicable to Example 2 and Example 3, which will be described later.

Further, one of movable second lens group G2 and fourth lens group G4 arranged closest toward the subject side as described above, namely second lens group G2, has negative power, and lens L6 arranged toward the image formation side of this second lens group G2 having negative power is a biconvex lens having positive power. The effect of suppressing focus breathing is more remarkably achieved by adopting this power arrangement. The configuration and the advantageous effect achievable by the configuration, as described so far, are also applicable to Example 2 and Example 3, which will be described later. Further, in addition to biconvex lens L6, a lens having positive power may be further arranged toward the image formation side of lens L2 having negative power.

Further, second lens group G2 having negative power, as described above, has concave surfaces toward the subject side and the image formation side, as a whole, and lens L6 having positive power has at least a convex surface toward the subject side out of the subject side and the image formation side. More remarkable effect of suppressing focus breathing is achievable by adopting such lens surface shapes. The configuration and the advantageous effect achievable by the configuration, as described so far, are also applicable to Example 2 and Example 3, which will be described later.

The aforementioned lens L6 is a biconvex lens having convex surfaces toward both of the subject side and the image formation side. Instead of such a biconvex lens, a lens having positive power, and which has a convex surface only toward the subject side, namely positive meniscus lens may be used. Example 2 and Example 3, which will be described later, are configured in such a manner.

Third lens group G3 arranged between movable second lens group G2 and fourth lens group 4, as described above, is constituted of a cemented lens of lens L4 having negative power and lens L5 having positive power cemented together. Chromatic aberration is suppressible by adopting such a cemented lens. The configuration and the advantageous effect achievable by the configuration, as described so far, are also applicable to Example 2 and Example 3, which will be described later.

Further, movable second lens group G2 and fourth lens group G4, which move as described above, and third lens group G3 arranged therebetween are arranged toward the subject side of aperture stop St and flare cutter Sv provided in the present lens for filming. Aperture stop St and flare cutter Sv are generally arranged near a lens having a large effective diameter, but focus breathing is easily suppressible by moving lenses arranged toward the subject side of the position of such a stop for focusing. The configuration and the advantageous effect achievable by the configuration, as described so far, are also applicable to Example 2 and Example 3, which will be described later.

Next, regarding numerical values in the specification of each element in this Example 1, values when being focused at infinity will be described with reference to FIG. 3 through FIG. 5. Note that values explained below are preferred examples, and needless to say, not only these numerical values are adoptable in the present disclosure.

FIG. 3 shows basic lens data of the lens for filming in Example 1. Further, FIG. 4 shows combined focal lengths of cemented lenses used in Example 1. FIG. 5 shows data related to temperature coefficients of the refractive index of each lens. The meaning of signs in the tables will be described by using Example 1, as an example, but the meaning is basically similar also in Example 2 and Example 3.

Regarding the basic lens data in FIG. 3, the column of No. shows the surface number of an i-th surface (i=1, 2, 3 . . . ), sequentially increasing toward the image formation side from a surface of composition elements closest toward the subject side, as the first surface. Here, the surface of i=0 is a surface of the subject, indicated by "OBJ". The column of Ri shows the curvature radius of the i-th surface, and the column of di shows a surface distance on optical axis Z between the i-th surface and the (i+1)th surface. The column of Di shows the effective diameter of the i-th surface. The data showing lengths are expressed by the unit of mm. Further, the column of nd shows the refractive index of a j-th optical element (j=1, 2, 3 . . . ), sequentially increasing toward the image formation side from an optical element closest toward the subject side, as the first optical element, for d-line (wavelength of 587.6 nm), and the column of vd shows the Abbe's number of the same j-th optical element for d-line, and the column of FOCAL LENGTH shows the focal length of the same j-th optical element for d-line. Note that lenses are specified by attaching numbers to L, such as in L1 and L2, and the numbers correspond to the aforementioned j.

The sign of a curvature radius is positive when the shape of a surface is convex toward the subject side, and negative when the shape of a surface is convex toward the image formation side. The basic lens data show data also including aperture stop St, flare cutter Sv, cover glass CG and image plane Sim. Surface numbers are written for surfaces corresponding to aperture stop St and flare cutter Sv, respectively. Further, the second value from the bottom in the column of di is a surface distance between a surface of cover glass CG toward the image formation side and image plane Sim.

The focal lengths shown in FIG. 3 and FIG. 4 are expressed by the unit of mm, and the focal length of a lens having positive power is represented by a positive value, and the focal length of a lens having negative power is represented by a negative value. Regarding the "COMBINED FOCAL LENGTH" in FIG. 4, two lenses cemented together are shown in the left column with "/" therebetween, and the combined focal length of the lenses is shown in the right column. The values of these combined focal lengths are also for d-line.

Temperature coefficients of the refractive index of each lens, shown in FIG. 5, are values for e-line (wavelength of 546.07 nm), and NTa is a value for the range of 20° C. to 40° C., NTb is a value for the range of −20° C. to 0° C., and NTc is a value for the range of 40° C. to 60° C. Further, the two rightmost columns in this table show a difference between NTa and NTb and a difference between NTa and NTc. Further, each table of FIG. 3 through FIG. 5 shows numerical values appropriately rounded to predetermined digits.

Next, each value defined by the aforementioned conditional expression (1) will be analyzed. In this example, a movable lens having positive power, and which has a convex surface toward the subject side, is biconvex lens L6. According to FIG. 3, curvature radius Ra of a surface of this biconvex lens L6 toward the image formation side is Ra=−9814.0 mm, and its focal length fa=239.640 mm. Hence, fa/Ra=−0.024. This example satisfies conditional expression (1) in this manner, and it is recognizable that the lens surface of biconvex lens L6 toward the image formation side has a curvature radius close to that of a flat surface. The lens for filming in this example is able to further suppress focus breathing by adopting such configuration. Note that if the value of fa/Ra exceeds the upper limit value of conditional expression (1) or is lower than the lower limit value, it is impossible to achieve a remarkable effect of further suppressing focus breathing. The configuration and the advantageous effect achievable by the configuration, as described so far, are also applicable to Example 2 and Example 3, which will be described later.

Further, more detailed analysis shows that the value of fa/Ra=−0.024 satisfies also the aforementioned expression (1-1), and also expression (1-2). Therefore, the effect of further suppressing focus breathing is more remarkable.

Next, each value defined by the aforementioned conditional expressions (2) will be analyzed. In this example, focal length ft of the entire system of the lens for filming is ft=280 mm. Further, focal length fm1 of second lens group G2 (lenses L2 and L3), which is one of the plurality of movable lenses arranged closest to the subject side, is fm1=−310.890, and focal length fm2 of fourth lens group (lens L6), which is at least one movable lens having positive power and arranged toward the image formation side of lens group G3, which is another lens and a fixed lens, is fm2=239.640. Further, focal length fS of third lens group G3 (lenses L4 and L5), which is a fixed lens, is fS=406.420. Based on these values, the value of ft/|fm1|, the value of ft/|fm2| and the value of ft/|fS| are obtained as follows:

$ft/|fm1|=0.90;$ $ft/|fm2|=1.17;$ and $ft/|fS|=0.67.$

Hence, this example satisfies conditional expressions (2). Further, ft/|fm1|=0.90, ft/|fm2|=1.17 and ft/|fS|=0.67 satisfy also conditional expressions (3) and conditional expressions (3-1). The lens for filming in this example is able to further suppress focus breathing by adopting such configuration. Note that if the value of ft/|fm1|, the value of ft/|fm2| or the value of ft/|fS| exceeds the upper limit value of conditional expressions (2) or is lower than the lower limit value, it is impossible to achieve a remarkable effect of further suppressing focus breathing. Focus breathing is also suppressible by setting focal length fS of the fixed lens longer than focal lengths fm of the movable lenses, as guided by these conditional expressions (2), (3) and (3-1). The configuration and the advantageous effect achievable by the configuration, as described so far, are also applicable to Example 2 and Example 3, which will be described later.

Next, each value defined by the aforementioned conditional expressions (4) will be analyzed with reference to FIG. 5, which shows temperature coefficients of the refractive index of each lens and the like. Σ(NTa−NTb) is the total of the value of NTa−NTb for each lens L1 through L13. Further, Σ(NTa−NTc) is the total of the value of NTa−NTc for each lens L1 through L13. They are obtained, based on the values shown in FIG. 5, as follows:

$\Sigma(NTa-NTb)=0.3;$ and $\Sigma(NTa-NTc)=-1.2.$

Therefore, this example satisfies conditional expressions (4). Accordingly, a change in the focal position of the lens for filming caused by a change in temperature is suppressible.

Example 2

Next, a lens for filming according to Example 2 of the present disclosure will be described. In the following descriptions, a difference from Example 1 will be mainly described. The lens for filming in this Example 2, illustrated in a cross-sectional diagram of FIG. 6, differs from the lens for filming in Example 1 in that lens L11 is arranged between lens L10 and flare cutter Sv in fifth lens group G5. Note that lens L11 is a biconcave lens. Further, lens L6 is a biconvex lens in Example 1, but a positive meniscus lens is adopted as lens L6 in this Example 2.

FIG. 7 shows basic lens data of the lens for filming in Example 2. Further, FIG. 8 shows combined focal lengths of cemented lenses used in Example 2. FIG. 9 shows data related to temperature coefficients of the refractive index of each lens.

Next, each value defined by the aforementioned conditional expression (1) will be analyzed. In this Example 2, a movable lens having positive power, which has a convex surface toward the subject side, is biconvex lens L6. According to FIG. 7, curvature radius Ra of an image formation side of this biconvex lens L6 is Ra=18730.1 mm, and its focal length fa=296.090 mm. Therefore, fa/Ra=0.016. This Example 2 also satisfies conditional expression (1) in this manner, and it is recognizable that a lens surface of biconvex lens L6 toward the image formation side has a curvature radius close to that of a flat surface. The lens for filming in this example is able to further suppress focus breathing by adopting such configuration. Further, detailed analysis shows that the value of fa/Ra=0.016 satisfies also the aforementioned expression (1-1), and also expression (1-3). Therefore, the effect of further suppressing focus breathing is more remarkable.

In this example, focal length ft of the entire system of the lens for filming is ft=280 mm. Further, focal length fm1 of second lens group G2 (lenses L2 and L3), which is one of the plurality of movable lenses, is fm1=−307.130, and focal length fm2 of fourth lens group G4 (lens L6), which is another one of the plurality of movable lenses, is fm2=296.090. Further, focal length fS of third lens group G3 (lenses L4 and L5), which is a fixed lens, is fS=319.700. Based on these values, the value of ft/|fm1|, ft/|fm2| and the value of ft/|fS| are obtained as follows:

$ft/|fm1|=0.91;$ $ft/|fm2|=0.95;$ and $ft/|fS|=0.88.$

Hence, this example satisfies conditional expressions (2) and (3). The lens for filming in this example is able to further suppress focus breathing by adopting such configuration. Focus breathing is also suppressible by setting focal length fS of the fixed lens longer than focal lengths fm of the movable lenses, as guided by these conditional expressions (2) and (3).

Next, each value defined by the aforementioned conditional expressions (4) will be analyzed with reference to FIG. 9, which shows temperature coefficients of the refractive index of each lens and the like. Σ(NTa−NTb) is the total of the value of NTa−NTb for each lens L1 through L14. Further, Σ(NTa−NTc) is the total of the value of NTa−NTc for each lens L1 through L14. They are obtained, based on the values shown in FIG. 9, as follows:

$$\Sigma(NTa-NTb)=0.9; \text{ and}$$

$$\Sigma(NTa-NTc)=-1.3.$$

Therefore, this example satisfies conditional expressions (4). Accordingly, a change in the focal position of the lens for filming caused by a change in temperature is suppressible.

Example 3

Next, a lens for filming according to Example 3 of the present disclosure will be described. The lens for filming in this Example 3, illustrated in a cross-sectional diagram of FIG. 10, differs from the lens for filming in Example 1 in that lens L11 is arranged between lens L10 and flare cutter Sv in fifth lens group G5. Note that lens L11 is a negative meniscus lens having a convex surface toward the subject side. Further, lens L6 is a biconvex lens in Example 1, but a positive meniscus lens is adopted as lens L6 in this Example 3.

FIG. 11 shows basic lens data of the lens for filming in Example 3. Further, FIG. 12 shows combined focal lengths of cemented lenses used in Example 3. FIG. 13 shows data related to temperature coefficients of the refractive index of each lens.

Next, each value defined by the aforementioned conditional expression (1) will be analyzed. In this Example 3, a movable lens having positive power, which has a convex surface toward the subject side, is biconvex lens L6. According to FIG. 11, curvature radius Ra of an image formation side of this biconvex lens L6 is Ra=17285.5 mm, and its focal length fa=270.640 mm. Therefore, fa/Ra=0.016. This Example 3 also satisfies conditional expression (1) in this manner, and it is recognizable that a lens surface of biconvex lens L6 toward the image formation side has a curvature radius close to that of a flat surface. The lens for filming in this example is able to further suppress focus breathing by adopting such configuration. Further, detailed analysis shows that the value of fa/Ra=0.016 satisfies also the aforementioned expression (1-1), and also expression (1-3). Therefore, the effect of further suppressing focus breathing is more remarkable.

In this example, focal length ft of the entire system of the lens for filming is ft=280 mm. Further, focal length fm1 of second lens group G2 (lenses L2 and L3), which is one of the plurality of movable lenses, is fm1=−312.500, and focal length fm2 of fourth lens group G4 (lens L6), which is another one of the plurality of lenses, is fm2=270.640. Further, focal length fS of third lens group G3 (lenses L4 and L5), which is a fixed lens, is fS=344.920. Based on these values, the value of ft/|fm1|, ft/|fm2| and the value of ft/|fS| are obtained as follows:

$$ft/|fm1|=0.89;$$

$$ft/|fm2|=1.03; \text{ and}$$

$$ft/|fS|=0.81.$$

Hence, this example satisfies conditional expressions (2) and (3-1). The lens for filming in this example is able to further suppress focus breathing by adopting such configuration. Focus breathing is also suppressible by setting focal length fS of the fixed lens longer than focal lengths fm of the movable lenses, as guided by these conditional expressions (2) and (3-1).

Next, each value defined by the aforementioned conditional expressions (4) will be analyzed with reference to FIG. 13, which shows temperature coefficients of the refractive index of each lens and the like. $\Sigma(NTa-NTb)$ is the total of the value of NTa−NTb for each lens L1 through L14. Further, $\Sigma(NTa-NTc)$ is the total of the value of NTa−NTc for each lens L1 through L14. They are obtained, based on the values shown in FIG. 13, as follows:

$$\Sigma(NTa-NTb)=0.2; \text{ and}$$

$$\Sigma(NTa-NTc)=-1.0.$$

Therefore, this example satisfies conditional expressions (4). Accordingly, a change in the focal position of the lens for filming caused by a change in temperature is suppressible.

So far, the present disclosure has been described by using plural examples, but the present disclosure is not limited to the aforementioned examples, and various modifications are possible. For example, values, such as the curvature radius, surface distance, refractive index and Abbe's number of each lens element, are not limited to the values presented in each example, but may be other values.

EXPLANATION OF THE REFERENCE NUMERALS

CG cover glass
G1 first lens group
G2 second lens group
G3 third lens group
G4 fourth lens group
G5 fifth lens group
L1 through L14 lenses
St aperture stop
Sv flare cutter
Sim image plane
Z optical axis

The invention claimed is:

1. A lens for filming, comprising:
a plurality of movable lens groups arranged apart from each other in the direction of an optical axis, and which move in the direction of the optical axis for focusing,
wherein a fixed lens group, which does not move, is provided between at least one pair of movable lens groups adjacent to each other among the plurality of movable lens groups, and all the movable lens groups and the fixed lens groups are arranged toward the subject side of a position of a stop of the lens for filming, wherein a movable lens group arranged closest to a subject side among the plurality of movable lens groups has negative power.

2. The lens for filming, as defined in claim 1,
wherein at least one movable lens group arranged toward an image formation side of the movable lens group having the negative power has positive power.

3. The lens for filming, as defined in claim 2,
wherein the movable lens group having the negative power has a lens having a concave surface toward the subject side and a concave surface toward the image formation side, and
wherein the movable lens group having the positive power has a lens having at least a convex surface toward the subject side out of the subject side and the image formation side.

4. The lens for filming, as defined in claim 3,
wherein the movable lens group having the positive power satisfies the following relationship:

$$-0.1 \leq fa/Ra \leq 0.1,$$

where fa is a focal length and Ra is a curvature radius of the image formation side.

5. The lens for filming, as defined in claim 4,
wherein the following relationships are satisfied:

$0.7 \leq ft/|fm1| \leq 1.5;$ $0.7 \leq ft/|fm2| \leq 1.5;$ and $0.4 \leq ft/|fS| \leq 1.2,$ where ft is the focal length of an entire system of the lens for filming, fml is the focal length of the movable lens group arranged closest to the subject side among the plurality of movable lens group, fm2 is the focal length of at least one movable lens group having positive power arranged toward an image formation side of the fixed lens group, and fS is the focal length of the fixed lens group.

6. The lens for filming, as defined in claim 3,
wherein the following relationships are satisfied:

$0.7 \leq ft/|fm1| \leq 1.5;$ $0.7 \leq ft/|fm2| \leq 1.5;$ and $0.4 \leq ft/|fS| \leq 1.2,$ where ft is the focal length of an entire system of the lens for filming, fml is the focal length of the movable lens group arranged closest to the subject side among the plurality of movable lens groups, fm2 is the focal length of at least one movable lens group having positive power arranged toward an image formation side of the fixed lens group, and fS is the focal length of the fixed lens group.

7. The lens for filming, as defined in claim 6,
wherein the following relationships are satisfied:

$0.7 \leq ft/|fm1| \leq 1.1;$ $0.8 \leq ft/|fm2| \leq 1.5;$ and $0.5 \leq ft/|fS| \leq 1.1.$ 8. The lens for filming, as defined in claim 3,
wherein the fixed lens group is constituted of a cemented lens of a lens having negative power and a lens having positive power.

9. The lens for filming, as defined in claim 3,
wherein temperature coefficients of the refractive index of each lens constituting the lens for filming satisfy the following relationships:

$|\Sigma(NTa-NTb)| \leq 2;$ and $|\Sigma(NTa-NTc)| \leq 2,$ where NTa ($10^{-6}$/K) is a temperature coefficient at from 20° C. to 40° C., NTb ($10^{-6}$/K) is a temperature coefficient at from −20° C. to 0° C. and NTc ($10^{-6}$/K) is a temperature coefficient at from 40° C. to 60° C.

10. The lens for filming, as defined in claim 2,
wherein the following relationships are satisfied:

$0.7 \leq ft/|fm1| \leq 1.5;$ $0.7 \leq ft/|fm2| \leq 1.5;$ and $0.4 \leq ft/|fS| \leq 1.2,$ where ft is the focal length of an entire system of the lens for filming, fml is the focal length of the movable lens group arranged closest to the subject side among the plurality of movable lens groups, fm2 is the focal length of at least one movable lens group having positive power arranged toward an image formation side of the fixed lens group, and fS is the focal length of the fixed lens group.

11. The lens for filming, as defined in claim 10,
wherein the following relationships are satisfied:

$0.7 \leq ft/|fm1| \leq 1.1;$ $0.8 \leq ft/|fm2| \leq 1.5;$ and $0.5 \leq ft/|fS| \leq 1.1.$ 12. The lens for filming, as defined in claim 2,
wherein the fixed lens group is constituted of a cemented lens of a lens having negative power and a lens having positive power.

13. The lens for filming, as defined in claim 2,
wherein temperature coefficients of the refractive index of each lens constituting the lens for filming satisfy the following relationships:

$|\Sigma(NTa-NTb)| \leq 2;$ and $|\Sigma(NTa-NTc)| \leq 2,$ where NTa ($10^{-6}$/K) is a temperature coefficient at from 20° C. to 40° C., NTb ($10^{-6}$/K) is a temperature coefficient at from −20° C. to 0° C. and NTc ($10^{-6}$/K) is a temperature coefficient at from 40° C. to 60° C.

14. The lens for filming, as defined in claim 1,
wherein the following relationships are satisfied:

$0.7 \leq ft/|fm1| \leq 1.5;$ $0.7 \leq ft/|fm2| \leq 1.5;$ and $0.4 \leq ft/|fS| \leq 1.2,$ where ft is the focal length of an entire system of the lens for filming, fml is the focal length of the movable lens group arranged closest to the subject side among the plurality of movable lens groups, fm2 is the focal length of at least one movable lens group having positive power arranged toward an image formation side of the fixed lens group, and fS is the focal length of the fixed lens group.

15. The lens for filming, as defined in claim 14,
wherein the following relationships are satisfied:

$0.7 \leq ft/|fm1| \leq 1.1;$ $0.8 \leq ft/|fm2| \leq 1.5;$ and $0.5 \leq ft/|fS| \leq 1.1.$ 16. The lens for filming, as defined in claim 1,
wherein the fixed lens group is constituted of a cemented lens of a lens having negative power and a lens having positive power.

17. The lens for filming, as defined in claim 1,
wherein temperature coefficients of the refractive index of each lens constituting the lens for filming satisfy the following relationships:

$|\Sigma(NTa-NTb)| \leq 2;$ and $|\Sigma(NTa-NTc)| \leq 2,$ where NTa ($10^{-6}$/K) is a temperature coefficient at from 20° C. to 40° C., NTb ($10^{-6}$/K) is a temperature coefficient at from −20° C. to 0° C. and NTc ($10^{-6}$/K) is a temperature coefficient at from 40° C. to 60° C.

* * * * *